US006851442B2

(12) United States Patent
Knowles et al.

(10) Patent No.: US 6,851,442 B2
(45) Date of Patent: Feb. 8, 2005

(54) FLUID ADDITION APPARATUS (75) Inventors: Steven M. Knowles, Silver Lake, IN (US); John Burke, New Baltimore, MI (US)

(73) Assignee: Bright Solutions Inc., Troy, MI (US)

( * ) Notice: Subject to any disclaimer, the term of this patent is extended or adjusted under 35 U.S.C. 154(b) by 0 days.

(21) Appl. No.: 10/682,805

(22) Filed: Oct. 10, 2003

(65) Prior Publication Data

US 2004/0112443 A1 Jun. 17, 2004

Related U.S. Application Data

(63) Continuation-in-part of application No. 10/286,953, filed on Nov. 4, 2002, now Pat. No. 6,807,976.

(51) Int. Cl.[7] ............................. F16L 37/28; F16K 31/34
(52) U.S. Cl. ................. 137/1; 137/614.03; 137/614.05; 141/1; 141/4; 141/18; 252/964
(58) Field of Search .................... 141/1, 4, 18, 383; 252/964; 137/614, 614.02, 614.03, 614.04, 614.05

(56) References Cited

U.S. PATENT DOCUMENTS

| | | |
|---|---|---|
| 2,768,678 A | 10/1956 | Schwank |
| 4,745,772 A | 5/1988 | Ferris |
| 4,758,366 A | 7/1988 | Parekh |
| 4,938,063 A | 7/1990 | Leighley |
| 5,027,605 A | 7/1991 | Hardesty |
| 5,149,453 A | 9/1992 | Parekh |
| 5,167,140 A | 12/1992 | Cooper et al. |
| 5,349,998 A | 9/1994 | Gonfiantini |
| 5,357,782 A | 10/1994 | Henry |
| 5,574,213 A | 11/1996 | Shanley |
| RE35,395 E | 12/1996 | Henry |
| 5,650,563 A | 7/1997 | Cooper et al. |
| 5,740,835 A | 4/1998 | Murphy |
| 5,826,636 A | 10/1998 | Trigiani |
| 5,967,204 A | 10/1999 | Ferris et al. |
| 5,975,151 A | 11/1999 | Packo |
| 5,975,490 A | 11/1999 | Essman |
| 6,029,720 A | 2/2000 | Swinford |
| 6,050,310 A | 4/2000 | Trigiani |
| 6,056,162 A | 5/2000 | Leighley |
| 6,155,066 A | 12/2000 | Chandler et al. |
| 6,170,541 B1 | 1/2001 | Sanhaji |
| 6,183,663 B1 * | 2/2001 | Kalley et al. .................. 252/68 |
| 6,186,197 B1 | 2/2001 | Trigiani |
| 6,250,603 B1 | 6/2001 | Knowles et al. |
| 6,296,228 B1 | 10/2001 | Knowles et al. |
| 6,539,988 B1 | 4/2003 | Cowan et al. |
| 6,561,237 B1 * | 5/2003 | Brass et al. .................. 141/383 |

OTHER PUBLICATIONS

Davis, "Pinpointing HFC–134a leaks is easy if you use the proper equipment", Air Conditioning, Heating & Refrigeration News, Dec. 7, 1992 pp. 36–41.
Davis, "Pinpointing Vehicle Leaks Faster with Ultraviolet Light", The American Society for Nondestructive Testing, Inc., Nov. 1989, vol. 47, No. 11, pp. 1248–1250.
Instructions for Interdynamics Direct Charge R–134a Automotive AC Fluorescent Dye Leak Detector Kit.

* cited by examiner

*Primary Examiner*—Kevin Lee
(74) *Attorney, Agent, or Firm*—Steptoe & Johnson LLP (57) ABSTRACT

An apparatus for adding fluid to a closed system can be connected to a service port of the system. The fluid can be added to the system by actuating valves on the system and on the fluid supply. The apparatus facilitates clean addition of the fluid to the system. The system can be a climate control system.

29 Claims, 5 Drawing Sheets

FLUID ADDITION APPARATUS

CLAIM OF PRIORITY

This application is a continuation-in-part of U.S. application Ser. No. 10/286,953 filed Nov. 4, 2002, now U.S. Pat. No. 6,807,976, which is hereby incorporated by reference in its entirety.

TECHNICAL FIELD

This invention relates to a method and apparatus for introducing a fluid into a closed system.

BACKGROUND

Introduction of a fluid into a closed system can require devices and techniques to be developed that optimize the neatness and cleanliness of the introduction. The introduction of a fluid can be particularly challenging when the fluid has a color, odor, or is potentially dangerous. One type of fluid and system for which these issues can be important is in leak detection methods developed to analyze fluid systems, such as climate control systems, such as heating, cooling, ventilating, and air conditioning systems, using dyes. Some methods employ emissive substances, such as, for example, fluorescent or phosphorescent dyes that are added to the refrigerants and/or lubricants of a climate control system. Suitable leak detection dyes include naphalimide, perylene, thioxanthane, coumarin, or fluorescein and derivatives thereof. Leaks can be detected by observing light emission from the dye at leak sites resulting from excitation of the dye with a light source having particular illumination characteristics (e.g. at wavelengths suitable to excite the dye and cause light emission from the dye). In general the dyes emit brightly when excited by light in the 190 to 700 nanometer wavelength range.

SUMMARY

In general, the invention features an apparatus and method for introducing a fluid, such as a leak detection dye composition, into a closed system, such as a climate control system. The apparatus can include a body with two ports. One port attaches to a service port of the closed system and the other port holds a fluid containing reservoir used to transfer the fluid into the system. The two ports can be directly in-line with one another or the second port can be offset by an angle in the middle of the body. This offset can allow for complete draining of the fluid into the system when the system port connection with the first port of the apparatus is horizontal.

In one aspect, an apparatus for introducing fluid into a system includes a body, and a supply member adjacent to the first port extending into the body. The body includes an interior region within the body, a first port adjacent to the interior region, and a second port fluidly connected to the first port by a passageway within the body. The supply member includes a valve actuating end adjacent to the first port and a fluid supply end adjacent to the second port. The supply member is in moveable contact with the valve actuating end such that the fluid supply end moves toward the interior region when the valve actuating end moves away from the interior region, and the fluid supply end moves away from the interior region when the valve actuating end moves toward the interior region. The body can include a gasket adjacent to the first port.

In another aspect, an apparatus for introducing a leak detection dye composition into a climate control system includes a body, a first supply member adjacent to the first port and extending into the body, and a service port connector adjacent to the first port. The body includes an inner region within the body, a first port adjacent to the interior region, and a second port fluidly connected to the first port by a passageway within the body. The first supply member includes a valve actuating end adjacent to the first port and a contact end within the body, and a second supply member adjacent to the second port and extending into the body. The second supply member includes a valve actuating end adjacent to the second port, the second supply member being in moveable contact with the contact end of a first supply member such that the second supply member moves toward the interior region when the first supply member moves away from the interior region and the second supply member moves away from the interior region when the first supply member moves toward the interior region.

The apparatus can include a service port connector adjacent to the first port. The service port connector can include a latch mechanism adjacent to the first port. The latch mechanism can include a release sleeve including a plurality of balls. In another embodiment, the service port connector can include a swivel nut adjacent to the first port and having threads on an external surface of the nut configured to threadably attach to a surface of a service port. The apparatus can include a fluid supply connector adjacent to the second port. The fluid supply connector can include threads configured to threadably receive a threaded fluid supply container. The apparatus can include a spring within the body and adjacent to the supply member, or the first supply member, to bias the valve actuating end toward the interior region.

The supply member can include a first supply member including the valve actuating end and a second supply member including the fluid supply end and in moveable contact with the first supply member. The first supply member and the second supply member can surround the passageway.

In another aspect, a method of introducing a fluid into a closed system includes attaching a first port of an injection apparatus to a service port of the system, attaching a fluid supply reservoir to a second port of the injection apparatus, moving the fluid supply reservoir relative to the injection apparatus to actuate a valve in the fluid supply reservoir and a valve in the service port, and transporting a fluid from the fluid supply source though the injection apparatus and into the fluid system. The fluid supply reservoir can be a container including a leak detection dye composition. The container can be a pressurized container including a threaded neck including a valve. The leak detection dye composition can include a refrigerant and a dye and, optionally, a lubricant. The first port can be attached to the service port by sealably coupling the first port to the service port. The fluid supply reservoir can be attached to the second port by threading the supply reservoir into the second port. The fluid supply reservoir can be moved relative to the injection apparatus by contacting the supply reservoir with a supply member within the injection apparatus and sliding the supply member toward the service port to actuate the valve in the service port. The fluid can be transported by propelling the fluid from the fluid supply reservoir into the fluid system with a refrigerant.

In another aspect, a method of introducing a leak detection dye composition into climate control system includes providing an apparatus, attaching a service port of the climate control system to a first port of the apparatus, inserting a container including a leak detection dye composition into a second port of the apparatus, moving the container toward the fluid supply end of the apparatus, moving a supply member and a valve actuating end of the apparatus toward the service port thereby opening the service port, and transporting the leak detection dye composition from the container to the climate control system. The container can be moved toward the fluid supply end and the supply member and the valve actuating end can be moved toward the service port substantially simultaneously. The leak detection dye composition can be transported by propelling the leak detection dye composition from the container into the fluid system with a refrigerant. The method can include opening a valve in the container with the fluid supply end after opening the service port or moving the supply member and the valve actuating end away from the service port thereby closing the service port and removing the apparatus from the service port.

The apparatus can be connected to the service port of a climate control system. This connection can be effected using a swivel nut as part of the body that has external threads matching the internal threads of the service port. The threads can be 8 or 9 mm threads.

Alternatively, the connection to the service port of the climate control system can be made using a latch mechanism. This latch mechanism could be made up of a ball release sleeve and latch balls that fit into a groove on the service port. Other forms of connection to the port known to those skilled in the art are also possible. An important aspect of the apparatus is that connection to the service port forms a sealed connection with a gasket adjacent to the first port on the apparatus. The method and apparatus can be used for leak detection in a climate control system.

The climate control system can be a mobile, stationary, window air conditioning system such as an automotive, portable, residential, or commercial air conditioning system or any other hermetic system that employs a refrigerant and a lubricant.

The fluid containing container can be connected to the second port via threads on the container and on an inner surface of the second port. The container can be pressurized and can include a valve. The container can be configured to form a seal with the second port to minimize spillage of the fluid. Similarly the first port can be configured with a gasket to form a seal with the service port of the system. When fluid is introduced into the system, the container is oriented to allow the fluid to flow by gravity to the valve. The remaining volume in the container contains a propellant, which can be a gas at atmospheric pressure and ambient temperature, in an amount sufficient to transport substantially all of the fluid from the container into the system.

The leak detection dye composition container can be a pressurized canister including a valve and threaded connector and sealing mechanism. The leak detection dye composition can include a dye, a refrigerant, and, optionally, a lubricant. The leak detection dye composition container can have a volume of less than about 5 ounces, preferably less than about 4 ounces and more preferably less than about 3 ounces. For example, the canister volume can be between 2 and 2.5 ounces. The dye composition can be added to the system by connecting the body to the service port, threading the dye composition container onto the second port causing the supply member to move into the body, and forcing the supply member into the service port to open a valve in the port. Once the container is threaded far enough onto the second port, the container valve will be actuated to open the container.

Pressurized material in the container, such as refrigerant or other propellant, expels the dye composition from the container into the system.

In another aspect, an apparatus for introducing fluid into a system includes a body including an interior region within the body, a first port adjacent to the interior region, and a valve extending from the interior region into the first port. The apparatus includes a second port fluidly connected to the first port by a passageway within the body and through the valve and a moveable supply member adjacent to the second port extending into the interior region within the body. The supply member can have two ends including a valve actuating end adjacent to the second port, and a valve actuating fluid supply end in the interior region. As the supply member moves toward the inner region, the valve actuating fluid supply end contacts the valve extending from the interior region into the first port.

The apparatus can also include a fluid supply connector adjacent to the first port. The fluid supply connector can include threads to threadably receive a first end of a service port connector. The second end of the service port connector can include a connector for connecting to a service port of a climate control system. The service port connector can include a coupler such as an R-134a coupler, or an R-12 coupler. The service port connector can include a hose with the coupler. The coupler can be a snap coupler The apparatus can also include a fluid reservoir connector adjacent to the second port. The fluid reservoir connector can be threaded to threadably receive a fluid reservoir. The fluid reservoir can be an evacuated container with a threaded neck and a valve. The container can contain a leak detection dye composition which can be a lubricant and a dye and the dye can be a naphthalimide dye.

The apparatus can also include a spring within the body and adjacent to the supply member to bias the valve actuating fluid supply end toward the second port.

In another aspect, a method of introducing a fluid into a closed system includes attaching a first port of an injection apparatus to a service port of the system, attaching a fluid supply reservoir to a second port of the injection apparatus, moving the fluid supply reservoir relative to the injection apparatus to actuate a valve in the fluid supply reservoir and a valve in the injection apparatus and transporting a fluid from the fluid supply source through the injection apparatus and into the fluid system. The system can be a climate control system. The fluid supply reservoir can be a reduced pressure container with a threaded neck valve including a leak detection dye composition including a lubricant and a dye. The reduced pressure in the container is less than ambient pressure, preferably less than 5 psi. The dye can be a naphthalimide dye. The leak detection dye composition can also include a refrigerant.

Attaching the fluid supply reservoir to the second port includes threading the supply reservoir into the second port. Moving the fluid supply reservoir relative to the injection apparatus includes contacting the supply reservoir with a supply member within the injection apparatus and sliding the supply member toward the interior region to actuate the valve in the injection apparatus. Attaching the first port to the service port can include coupling the first end of a service port connector to the fluid supply connector adjacent to the first port and coupling a second end of the service port connector to the service port.

Transporting the fluid can include coupling a second end of the service port connector to the service port, exposing the injection apparatus to the pressure within the closed system and allowing it to equalize, activating the closed system causing the pressure in the closed system to drop resulting in the fluid in the fluid reservoir being injected into the closed system. The closed system can be a cooling system.

Advantageously, the method and apparatus can allow fluid to be added cleanly, with minimal or reduced spillage, to the closed system, and to minimize or reduce spillage of fluid when the apparatus is removed from the service port. By minimizing the volume and wetted surface area of the interior of the body of the apparatus, and by ensuring that there is an excess of propellant to blow the fluid through the body, the method and apparatus reduces the possible spillage of fluid. In addition, by including a biasing spring on the supply member in the body, the apparatus can be cleanly removed from the service port because the service port can be closed before the apparatus is removed from the service port. Finally, the angled nature of the apparatus ensures that the container or reservoir can be oriented so that substantially all of the fluid is removed from the container or reservoir and transported into the system.

The details of one or more embodiments invention are set forth in the accompanying drawings and the description below. Other features, objects, and advantages of the invention will be apparent from the description and drawings, and from the claims.

DETAILED DESCRIPTION

In general, an apparatus for introducing fluid into a fluid system, such as a closed or pressurized system, can include a body with two ports and connectors at each port for connecting securely to the service port of a fluid system and a fluid supply.

Figure 1:
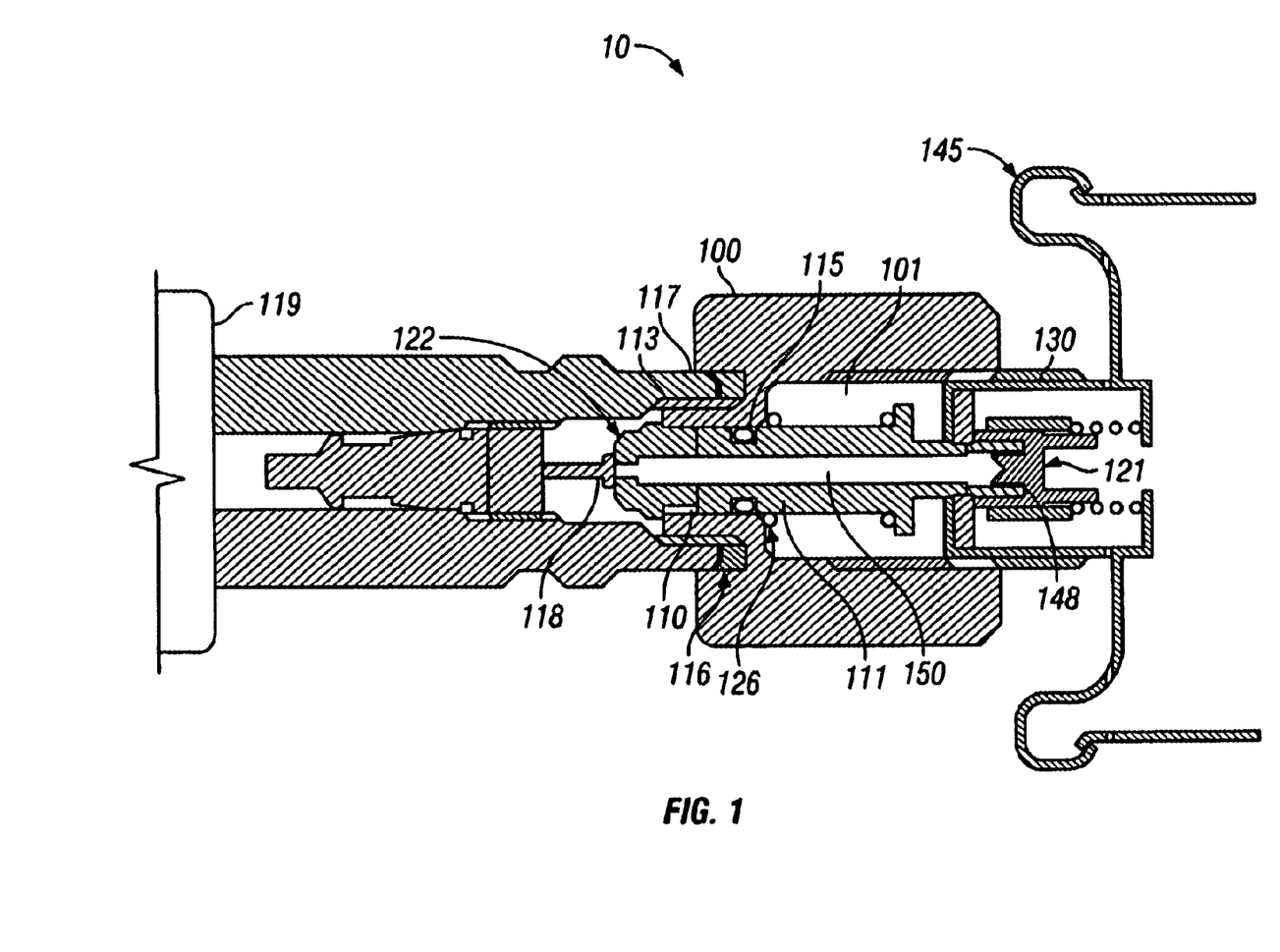
FIG. 1 is a schematic diagram depicting a sectional view of a horizontal apparatus.

FIG. 1 shows an apparatus 10 for adding a fluid to a closed system 119. The apparatus includes a body 100 with a first port 110 fluidly connected to a second port 130 and an interior region 101 within the body. Inside the body 100 is a supply member 111 that is adjacent to both the first and second ports 110 and 130. Supply member 111 has a valve actuating end 122 and a fluid supply end 148 fluidly connected via a passageway 150. Adjacent to the first port 110 is a sealing gasket 116. The body 100 forms a seal between first port 110 and the service port 117 of the system 119 at sealing gasket 116. The body 100 can connect to the service port 117 via a threaded connection 113 in which an external threaded surface on the first port 110 mates with an internal threaded surface of the service port 117. Similarly, a fluid container 145 forms a seal with the supply member 111 when connected to second port 130. The supply member 111 is sealed to body via O-ring 115. The supply member 111 is biased toward the second port 130 by spring 126. Spring 126 acts to hold the supply member 111 in place in the body 100 until the force from contact with the fluid container 145 at supply end 148 further compresses the spring. As the spring becomes compressed, the supply member 111 moves toward first port 110 into the service port 117. Valve actuating end 122 contacts the valve 118 within the service port 117, such as a Schraeder valve to open the service port. Fluid supply end 148 opens valve 121 on the fluid container 145. Valve 121 and valve 118 do not open until a seal is formed between first port 110 and service port 117 and between second port 130 and container 145. In one example, valve 121 and valve 118 are opened substantially simultaneously. In another example, valve 121 is opened prior to valve 118. When both valves 121 and 118 are open, fluid can flow through passageway 150 into the system 119.

Figure 2:
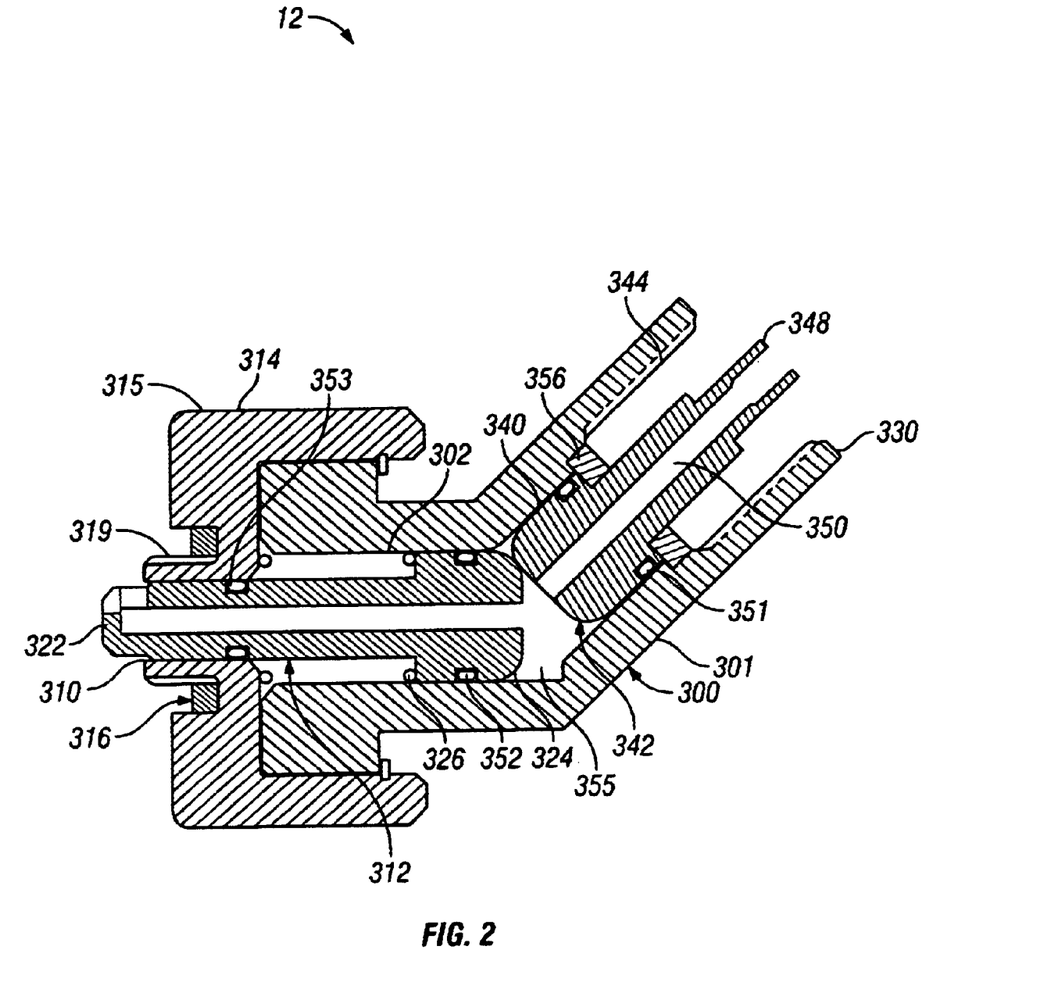
FIG. 2 is a schematic diagram depicting a sectional view of an angled apparatus with a latch mechanism connector with the container valve and the service port valve still closed.

FIG. 2 shows an apparatus 12 for adding fluid to a system. The apparatus 12 has a body 300. The body 300 includes a first port 310, a second port 330 and an interior region 302 within the body. The body 300 includes a service port connector 314, which contains first port 310, and angled member 301. Service port connector 314 can include a swivel nut 315 which is rotateably coupled to angled member 301. The swivel nut 315 engages the internal threads of the service port of the system (not shown) via an externally threaded surface 319 on the swivel nut 315. Tightening the swivel nut 315 causes a sealing gasket 316 to seal the body 300 to the service port. The apparatus 12 includes a first supply member 312 within interior region 301. First supply member 312 includes an inner contact end 324 that contacts the inner contact end 342 of a second supply member 340. The first supply member 312 has a valve actuating end 322 adjacent to the first port 310. The second supply member 340 has a fluid supply end 348 adjacent to the second port 330. The second port 330 has a threaded surface 344 for receiving a fluid supply container (not shown). The passageway 350 extends through the second supply member 340 into the angled member 301 and through the first supply member 312. The interior volume 355 formed between ends 324 and 342 is sealed by contacts between angled member 301 and each of O-rings 351, 352 and 353. Angled member 301 and supply members 312 and 340 can be configured to minimize interior volume 355.

The first supply member 312 is biased into angled member 301 by spring 326. Spring 326 acts to hold first supply member 312 in place in the body 300 until the force from contact with the second supply member 340 further compresses the spring. The spring 326 can assist in clean removal of the apparatus from the service port by ensuring that the first supply member 312 has a rest position that is not engaged with a valve in a service port. Thus, when the apparatus 12 is removed from the service port, the valve in the service port is necessarily closed. Retainer 356 holds second supply member 340 in angled member 301 and prevents the action of the spring 326 from forcing second supply member 340 out of the body 300.

Figure 3:
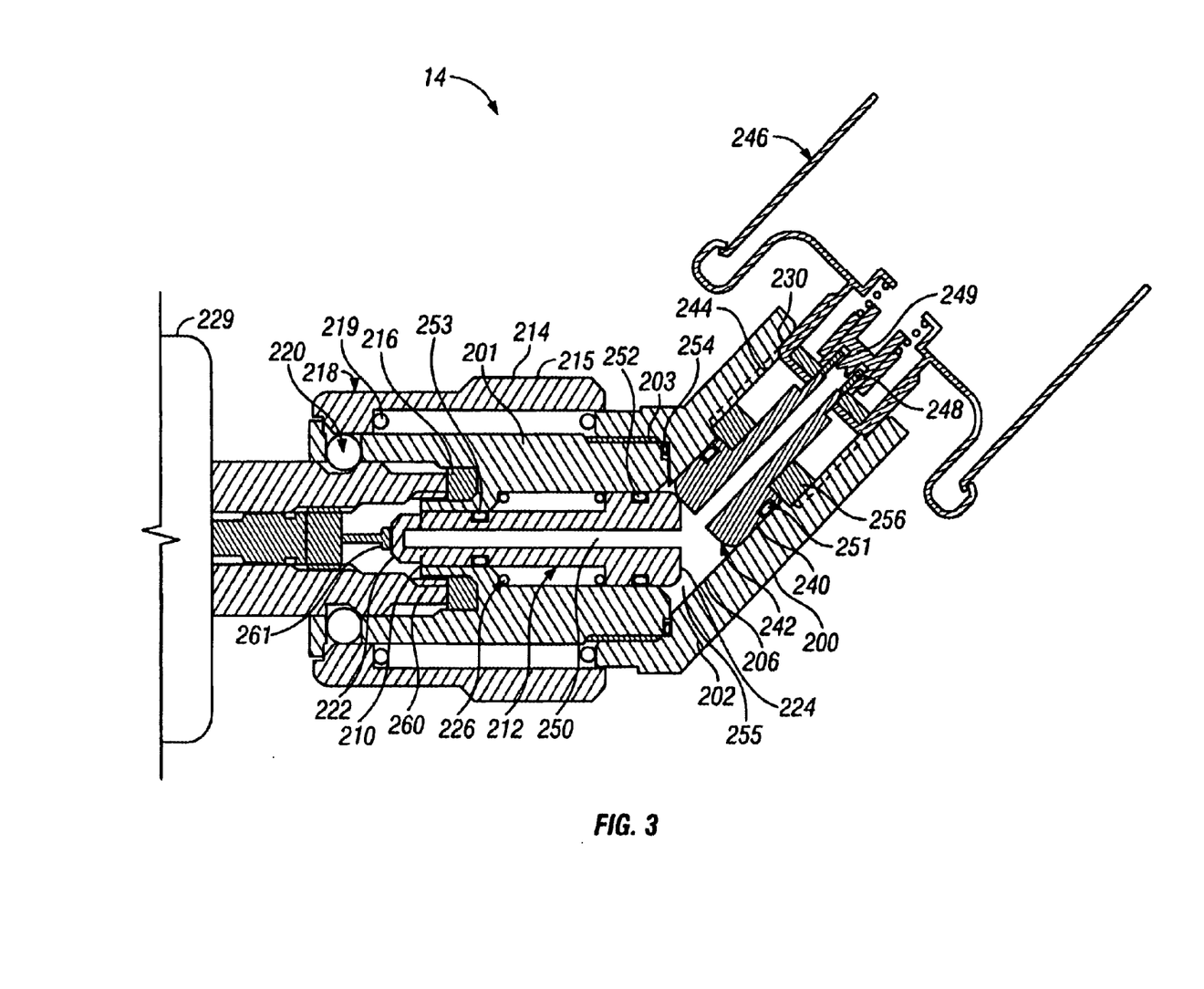
FIG. 3 is a schematic diagram depicting a sectional view of an angled apparatus with a swivel nut connector with the container valve and service port valve still closed
Figure 4:
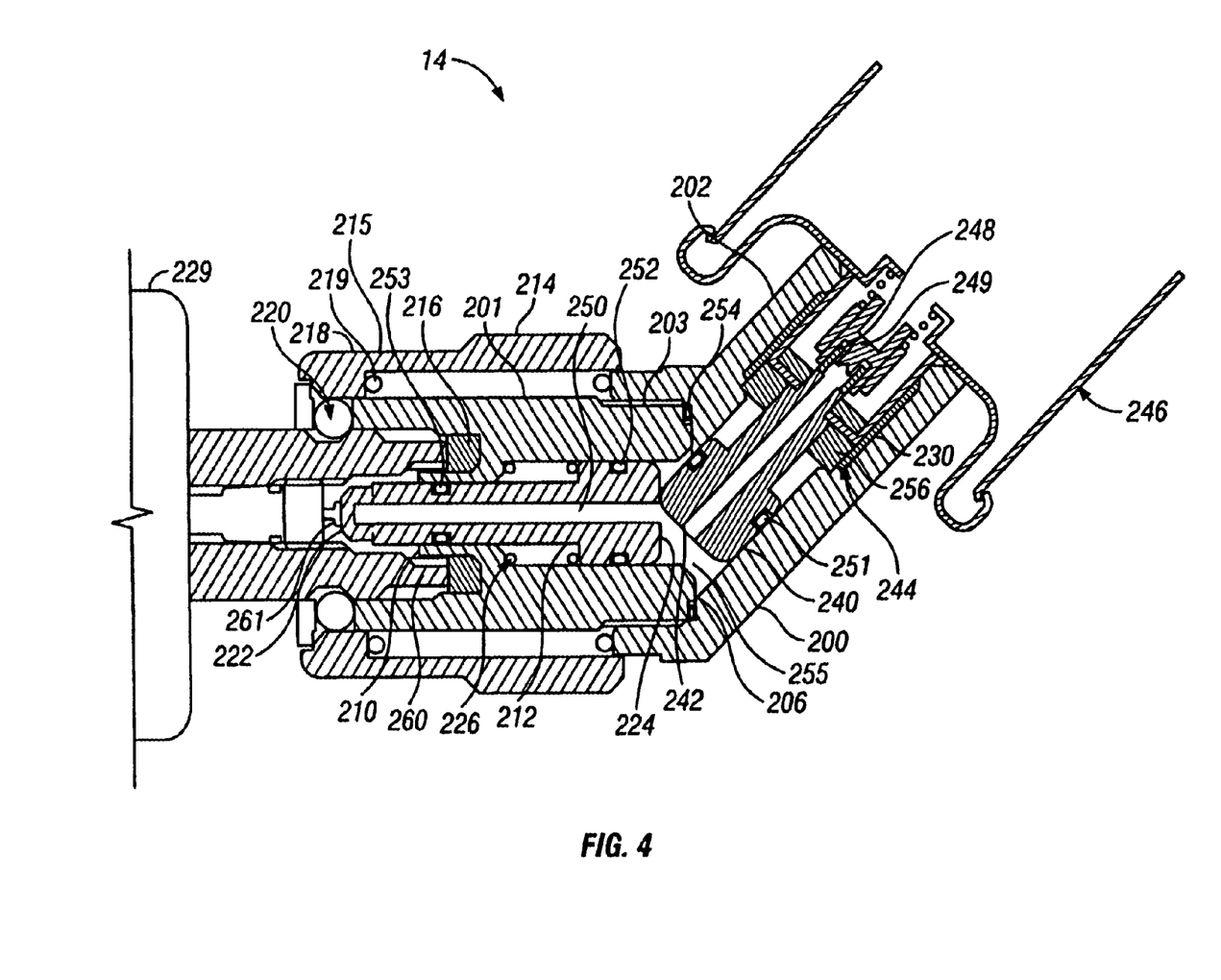
FIG. 4 is a schematic diagram depicting a sectional view of a service device with the valves open.

FIGS. 3 and 4 show an apparatus 14 for adding fluid to a system 229. The apparatus 14 includes a body 200 made up of two parts 201 and 202, and contains interior region 206. Part 201 is threadably and sealably attached to part 202 via threads 203 and O-ring 254. Part 201 contains first port 210 and part 202 contains second port 230. Adjacent to the first port is a first supply member 212, a service port connector 214, and a sealing gasket 216. The service port connector 214 includes a latch mechanism 215. Latch mechanism 215 includes a release sleeve 218, a spring 219 and latch balls 220 configured to attach to service port 260. The first supply member 212 has a valve actuating end 222 and an inner contact end 224 that is movably in contact with inner contact end 242 of the second supply member 240. The second supply member 240 sits adjacent to the second port 230 with a fluid supply end 248 adjacent to the second port 230. The second port 230 has a threaded surface 244 that are shown engaged with the neck of a threaded neck of fluid supply container 246. The threaded neck of fluid supply container 246 forms a seal with the fluid supply end 248 of the second supply member 240 as the fluid supply container 246 is connected to the second port 230. A passageway 250 extends through the second supply member 240 into an interior volume 255 and through the first supply member 212. The interior volume 255 of the body is sealed through O-rings 251, 252 and 253 such that when seals are formed at both the first port 210 and the second port 230, passageway 250 is sealed.

The first supply member 212 is biased by spring 226 that acts to hold first supply member 212 within the body until the force from contact with the second supply member 240 overcomes the tension of spring 226. The spring 226 serves to assist in clean removal of the apparatus from the service port 260 by ensuring that the first supply member 212 has a rest position that is not engaged with the valve 261 in the service port 260. Thus, when the apparatus is removed from the service port 260, the service port valve 261 is necessarily closed. Retainer 256 prevents the action of the spring 226 from forcing second supply member 240 out of the body.

FIG. 3 shows the apparatus 10 as it appears after latch mechanism 215 has been connected to a service port 260 of a fluid system 229 via release sleeve 218, latch balls 220 and latch spring 219. The first port 210 is in sealed contact via gasket 216 with the service port 260. In FIG. 3, the first valve actuating end 222 has not engaged valve 261 of service port 260 and valve 261 is closed. The fluid supply container 246 is sealed to second port 230 and, as shown has begun to engage threads 244 of the second port 230. The interior volume 255 and passageway 250 is now sealed from the external environment.

FIG. 4 shows the apparatus 14 after the fluid supply container 246 has been threaded onto threaded surface 244 far enough to engage and open the fluid supply valve 249 and valve 261 of the service port 260. As the fluid supply container 246 is threaded into the apparatus 14, second supply member 240 moves toward interior region 206. By virtue of the contact between the second supply member 240 at inner contact end 242 with the first supply member 212 at inner contact end 224, first supply member 212 moves out of the interior region 206 and toward service port 260. As first supply member 212 moves toward service port 260, valve actuating end 222 opens valve 261. Supply end 248 contacts and opens supply valve 249 as container 246 moves into second port 230. When valves 249 and 261 are open, fluid flows from fluid supply container 246, through passageway 250, and into the fluid system. As the fluid supply container 246 is unthreaded from second port 230, tension in spring 226 forces the first supply member 212 toward interior region 206 which, by virtue of the contact at inner contact ends 224 and 242, forces second supply member 240 away from interior region 206. The body 200 can be angled so that container 246 can be oriented with the top down, causing the fluid to be introduced into the system to flow toward the apparatus 14. This configuration can help ensure most of the fluid is introduced into the system.

Figure 5A:
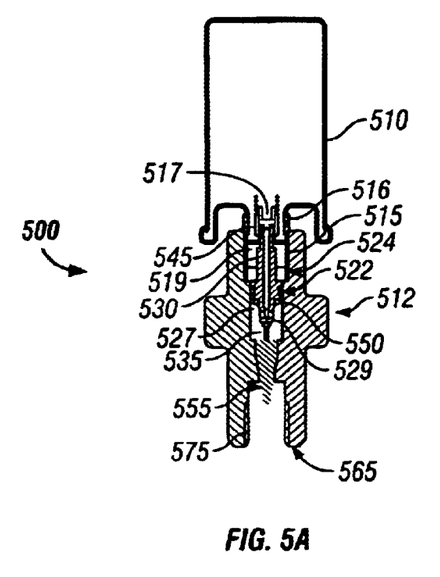
FIG. 5A is a schematic diagram of a remote service device with the service port valve and the container valve closed.
Figure 5B:
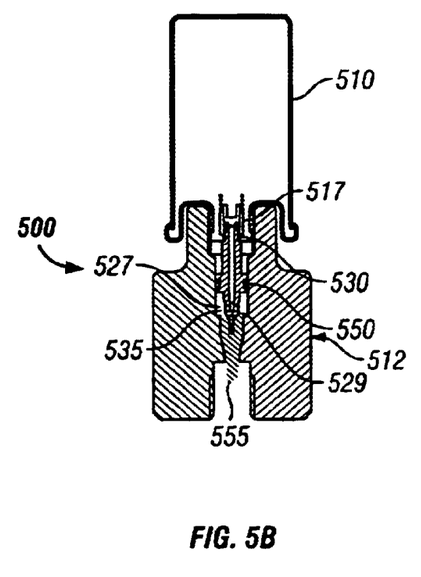
FIG. 5B is a schematic of a remote service device with the valves open.

FIGS. 5A–B show a remote service device 500 that does not connect directly to a service port of a fluid system. Remote service device 500 can connect to a fluid supply reservoir 510 via fluid reservoir connector 515. The fluid supply reservoir 510 can be a container with a threaded neck 516 and a valve 517. The fluid reservoir connector 515 can be threaded into the second port 519. FIG. 5A shows fluid supply reservoir 510 just starting to be threaded into second port 519. As the fluid supply reservoir 510 is threaded onto remote service device 500, supply member 530, extending from second port 519 into interior region 527, is moved further into interior region 527 where the valve actuating fluid supply end 529 of supply member 530 can contact valve 535 when the reservoir 510 is fully threaded onto device 500. Supply member 530 is biased into the second port 519 by spring 550. Retainer 524 prevents supply member 530 from exiting the second port due to the bias of spring 550. O-ring 522 creates a seal between supply member 530 and interior region 527. The tension in spring 550 causes valve actuating end 545 to contact with valve 517 and to slowly open as container 510 is threaded into the second port 519. As reservoir 510 advances into second port 519, supply member 530 advances into interior region 527 and contacts the valve 535 causing it to slowly open allowing access from the interior region 527 to the first port 555. Adjacent to first port 555 is fluid supply connector 565 that can connect to a service port connector via threads 575.

FIG. 5B shows the fluid supply reservoir 510 fully threaded onto the remote service device 500, resulting in the opening of valve 517 via contact with supply member 530 and tension from spring 550. When fully threaded onto the remote service device 500, fluid supply reservoir 510 forces valve actuating fluid supply end 529 of supply member 530 into contact with valve 535 causing it to open, creating a fluid passageway extending from the fluid supply reservoir 510, into the body 512 of the remote service device 500, through the interior region 527 through the valve 535 and into the first port 555 and subsequently into a service port connector (not shown). Fluid supply container 510 may be evacuated to a vacuum, may be at ambient pressure, may be pressurized, or may be at a reduced pressure. It may contain a lubricant for example, oil, a leak detection dye such as a naphthalimide, and a refrigerant or any combination of these.

Figure 6:
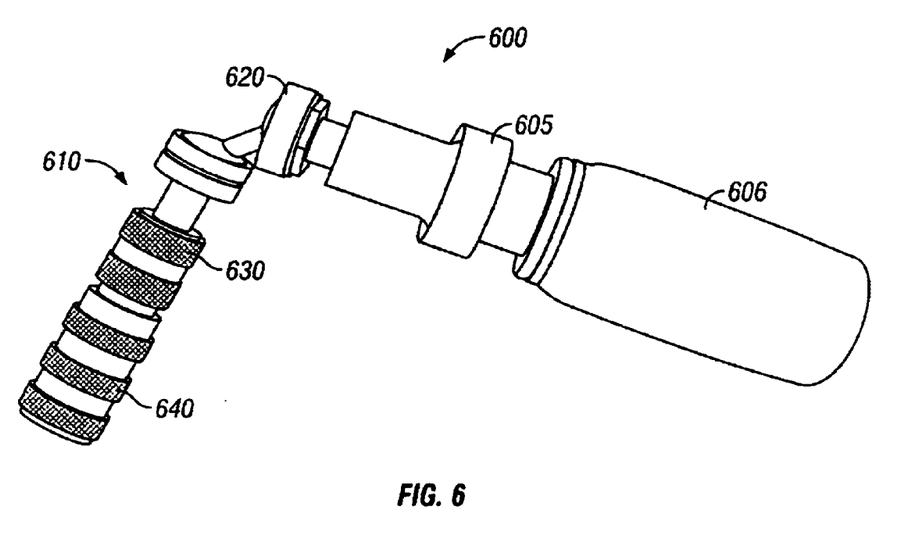
FIG. 6 is a picture of a remote service device with a swivel connector.

FIG. 6 shows an example of an apparatus 600 for introducing fluid into a system. It includes remote service device 605 with a fluid supply reservoir 606 attached to an example of a service port connector 610. The service port connector 610, in this example, includes a swivel fitting 620, as shown in U.S. patent application Ser. No. 09/982,928, the entire contents of which is hereby incorporated by reference, connected to an R-12 coupler 630, and/or an R134a coupler 640 as shown in U.S. Pat. Nos. 6,296,228, 6,250,603, and 6,539,970 the entire contents of each of which is hereby incorporated by reference. Coupler 640 can connect to an R-134a service port of a cooling system, while coupler 630 can connect to an R-12 service port of a cooling system. The service port connector can also be a hose with a threaded connection for connecting to the remote service device with either coupler connected to the other end of the hose for connecting to the appropriate service port of the cooling system.

The method and apparatus can be used to introduce a leak detection dye composition into a climate control system. The climate control system can be a mobile, stationary, window air conditioning system such as an automotive, portable, residential, or commercial air conditioning system or any other hermetic system that employs a refrigerant and a lubricant. Suitable materials of construction for the apparatus excluding O-rings, gasket, and springs include plastics, stainless steel and aluminum. O-rings and seals or gaskets can be butyl or silicon rubber or various other O-ring and gasket material. The springs can be made using a suitable metal or other suitable flexible material.

The leak detection dye composition can be added to the system. A body with a first port and second port is attached to the service port of the climate control system. The body forms a seal between the first port and the service port via a gasket adjacent to the first port. A leak detection dye composition supply is attached to the second port. The supply can be a hose, a canister or some other supply of a leak detection dye composition. The second port should form a seal with the dye composition supply. The supply can be connected to the second port causing a supply member in the body to actuate the valve on the dye composition supply and at essentially the same time actuate the valve on the service port of the climate control system. As long as the supply pressure is greater than the pressure in the climate control system the dye will be injected into the climate control system.

To ensure complete addition of the dye, the fluid path wetted surface area within the body is minimized and excess refrigerant is included in the dye composition supply to ensure complete clearance of the internal fluid passageway. Furthermore, the body can be angled between the first and second ports to allow gravity to assist in the addition operation, and to ensure complete dye composition addition especially for service ports that would otherwise be horizontal.

The leak detection dye can be also loaded into the system using an alternative method. The remote service device can be assembled and connected to the service port of an inactivated, non-operating climate control system (i.e. in a resting state, not turned on). A reduced pressure container with leak detection dye and a lubricant can be completely threaded onto the remote service device opening the container valve and the valve in the body of the remote service device exposing them to the pressure within the climate control system. The container will equalize pressure with the climate control system. The climate control system can then be activated (turned on) creating a pressure drop in the climate control system. The leak detection dye will be injected into the climate control system as the pressure seeks to reequalize. This method also can be used to load lubricant alone into the system.

After the leak detection dye has been loaded into the climate control system, the system is operated to circulate the leak detection dye composition. The circulating refrigerant disperses the leak detection dye throughout the system. Typically the dye content of the system can be below about 0.1 percent. After the dye has been allowed to circulate within the system, the system joints, components, or attachments can be examined with a light source having a wavelength from 190 nanometers to 700 nanometers. The presence of a leak can be determined by a colored visual indication such as fluorescence or other light emission, that can be detected after excitation with the light from the light source. Alternatively, if the leak detection composition includes a visible leak detection dye, visible to the unaided eye, the presence of the leak can be determined by visual inspection of the climate control system.

The leak detection dye composition supply can be in the form of a pressurized canister, a hose, a container, or any other fluid transfer or storage apparatus that can be connected to the second port. The leak detection composition can be a combination of a refrigerant, a lubricant, and a dye concentrate.

The refrigerant can include chlorofluorocarbons, hydrochlorofluorocarbons, hydrofluorocarbons, carbon dioxide, ammonia, halogenated or ether derivatives of methane or ethane, or halogenated ether or cyclic derivatives of propane, butane, or other hydrocarbons. Examples of a refrigerant include 1,1,1,2 tetrafluoroethane (R-134a, Allied Signal, Morristown, N.J.) and dichlorodifluoromethane (R-12, DuPont, Wilmington, Del.) The lubricant can include polyalkylene glycols, polyesters, mineral oils, polyvinyl ethers, alkylbenzenes, or other synthetic lubricating materials.

The dye concentrate can include leak detection dye such as a fluorescent dye. The fluorescent dye can include a naphthalimide dye, a perylene dye, a coumarin dye, a thioxane dye, a fluorescein dye, or a derivative thereof or other dye compatible with a climate control systems. The fluorescent dye can be liquid or solid, such as a powder. Examples of suitable dyes include liquid dyes, for example, STAY BRITE BSL 712, STAY BRITE BSL 713, STAY BRITE BSL 714 (Brite Solutions, Troy MI), DAY GLOW TRY-33 (Day Glow Color Corp, Cleveland, Ohio), R-12 Dye (part 16252, SPX Corporation, Robinair, Montpelier, Ohio), or R-134a Dye (part 16253, SPX Corporation, Robinair, Montpelier, Ohio), or other dyes.

The leak detection dye composition can include, for example a first weight amount of the dye concentrate and a second weight amount of the refrigerant. The first weight amount can be greater than the second weight amount. In other embodiments the leak detection dye composition can include, for example, a first weight amount of dye concentrate, a second weight amount of lubricant and a third weight amount of refrigerant. The first and second amounts together can be greater than the third amount. See, for example, U.S. Pat. No. 6,183,663, which is incorporated by reference in its entirety.

Other embodiments are within the claims.

What is claimed is:

1. An apparatus for introducing fluid into a system comprising:
    a body including:
        an interior region within the body;
        a first port adjacent to the interior region;
        a valve extending from the interior region into the first port; and
        a second port fluidly connected to the first port by a passageway within the body and through the valve; and
    a moveable supply member adjacent to the second port extending into the interior region within the body, the supply member having two ends including:
        a valve actuating end adjacent to the second port; and
        a valve actuating fluid supply end in the interior region, wherein as the supply member moves toward the inner region, the valve actuating fluid supply end contacts the valve extending from the interior region into the first port.

2. The apparatus of claim 1 further comprising a fluid supply connector adjacent to the first port.

3. The apparatus of claim 2 wherein the fluid supply connector includes threads to threadably receive a first end of a service port connector.

4. The apparatus of claim 3 wherein a second end of the service port connector includes a connector for connecting to a service port of a climate control system.

5. The apparatus of claim 4 wherein the service port connector includes a snap coupler.

6. The apparatus of claim 4 wherein the service port connector includes an R-134a coupler.

7. The apparatus of claim 4 wherein the service port connector includes an R-12 coupler.

8. The apparatus of claim 3 wherein the service port connector includes a hose with a coupler.

9. The apparatus of claim 8 wherein the coupler is a R-134a coupler.

10. The apparatus of claim 8 wherein the coupler is an R-12 coupler.

11. The apparatus of claim 1 further comprising a fluid reservoir connector adjacent to the second port.

12. The apparatus of claim 11 wherein the fluid reservoir connector is threaded to threadably receive a fluid reservoir.

13. The apparatus of claim 12 wherein the fluid reservoir contains leak detection dye composition.

14. The apparatus of claim 13 wherein the fluid reservoir is a reduced pressure container including a threaded neck including a valve.

15. The apparatus of claim 12 wherein the leak detection dye composition includes a lubricant and a dye.

16. The apparatus of claim 15 wherein the dye is a naphthalimide dye.

17. The apparatus of claim 1 further comprising a spring within the body and adjacent to the supply member to bias the valve actuating fluid supply end toward the second port.

18. A method of introducing a fluid into a closed system comprising:

attaching a first port of an injection apparatus to a service port of the system;

attaching a fluid supply reservoir to a second port of the injection apparatus;

moving the fluid supply reservoir relative to the injection apparatus to actuate a valve in the fluid supply reservoir and a valve in the injection apparatus;

reducing pressure in the closed system: and transporting a fluid from the fluid supply source through the injection apparatus and into the closed system having the reduced pressure.

19. The method of claim 18 wherein the system is a climate control system.

20. The method of claim 18 wherein the fluid supply reservoir is a container including a leak detection dye composition.

21. The method of claim 20 wherein the container is a reduced pressure container including a threaded neck including a valve.

22. The method of claim 20 wherein the leak detection dye composition includes a lubricant and a dye.

23. The method of claim 22 wherein the dye includes a naphthalimide dye.

24. The method of claim 22 wherein the leak detection dye composition further includes a refrigerant.

25. The method of claim 18 wherein attaching the fluid supply reservoir to the second port includes threading the supply reservoir into the second port.

26. The method of claim 18 wherein moving the fluid supply reservoir relative to the injection apparatus includes contacting the supply reservoir with a supply member within the injection apparatus and sliding the supply member toward the interior region to actuate the valve in the injection apparatus.

27. The method of claim 18 wherein attaching the first port to the service port includes coupling the first end of a service port connector to the fluid supply connector adjacent to the first port; and coupling a second end of the service port connector to the service port.

28. The method of claim 18 wherein transporting the fluid includes:

coupling a second end of the service port connector to the service port;

exposing the injection apparatus to the pressure within the closed system and allowing the pressure to equalize;

activating the closed system causing the pressure in the closed system to drop resulting in the fluid in the fluid reservoir being injected into the closed system.

29. The method of claim 28 wherein the closed system is a cooling system.

* * * * *